US011829398B2

(12) United States Patent
Park et al.

(10) Patent No.: US 11,829,398 B2
(45) Date of Patent: Nov. 28, 2023

(54) THREE-DIMENSIONAL PROBABILISTIC DATA STRUCTURE

(71) Applicant: salesforce.com, inc., San Francisco, CA (US)

(72) Inventors: Jacob Jonghan Park, St. Catharines (CA); Rohit Agrawal, San Francisco, CA (US); Thomas Fanghaenel, Oakland, CA (US)

(73) Assignee: Salesforce, Inc., San Francisco, CA (US)

( * ) Notice: Subject to any disclaimer, the term of this patent is extended or adjusted under 35 U.S.C. 154(b) by 105 days.

(21) Appl. No.: 16/845,921

(22) Filed: Apr. 10, 2020

(65) Prior Publication Data

US 2021/0319052 A1  Oct. 14, 2021

(51) Int. Cl.
| | | |
|---|---|---|
| G06F 15/16 | (2006.01) | |
| G06F 16/33 | (2019.01) | |
| G06F 16/182 | (2019.01) | |
| G06F 16/338 | (2019.01) | |
| G06F 16/17 | (2019.01) | |
| G06F 21/62 | (2013.01) | |

(52) U.S. Cl.
CPC ...... *G06F 16/3346* (2019.01); *G06F 16/1734* (2019.01); *G06F 16/182* (2019.01); *G06F 16/338* (2019.01); *G06F 21/6218* (2013.01); *G06F 2221/0751* (2013.01)

(58) Field of Classification Search
None
See application file for complete search history.

(56) References Cited

U.S. PATENT DOCUMENTS

| 5,202,986 A * | 4/1993 | Nickel ................ G06F 16/9027 |
| 8,290,972 B1 * | 10/2012 | Deshmukh ........ G06F 16/24556 |
| | | 707/758 |
| 9,367,574 B2 | 6/2016 | Gupta |
| 2003/0130981 A1 | 7/2003 | Nehru et al. |

(Continued)

OTHER PUBLICATIONS

Guo et al. Theory and Network Applications of Dynamic Bloom Filters. IEEE INFOCOM 2006, pp. 1-12. (Year: 2006).*

(Continued)

*Primary Examiner* — Alex Gofman
*Assistant Examiner* — Shelly X Qian
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to probabilistic data structures. A database node may maintaining a probabilistic data structure capable of encoding database keys. The probabilistic data structure may include a plurality of levels that are each capable of storing an indication of a transition between successive characters in a database key. The database node may insert a particular database key into the probabilistic data structure and the particular database key may comprise a series of characters. The inserting may include setting, for each transition between successive characters of the series of characters, an indication in a corresponding level of the plurality of levels that is indicative of that transition. The database node may further maintain lineage information specifying one or more lineages that correspond to the transition.

13 Claims, 9 Drawing Sheets

(56) References Cited

U.S. PATENT DOCUMENTS

2013/0132408 A1     5/2013   Little
2016/0335299 A1    11/2016   Vemulapati et al.

OTHER PUBLICATIONS

Hua et al. A Multi-attribute Data Structure with Parallel Bloom Filters for Network Services. HiPC 2006, pp. 277-288. (Year: 2006).*
Class HashMap<K,V>, https://docs.oracle.com/javase/10/docs/api/java/util/HashMap.html, Java SE 10 & JDK 10, 2018, pp. 1-14. (Year: 2018).*
Kapse. What is a null-terminated string in C/C++? https://www.tutorialspoint.com/what-is-a-null-terminated-string-in-c-cplusplus, May 2019, pp. 1-2. (Year: 2019).*
Binary Relations. https://web.archive.org/web/20170829194919/https://www.cs.clemson.edu/course/cpsc827/material/Language%20Theory/Binary%20Relations.pdf, 2017, pp. 1-8. (Year: 2017).*
Tarkoma et al. Theory and Practice of Bloom Filters for Distributed Systems. IEEE Communications Survey & Tutorials. 14:1 2012, pp. 131-155. (Year: 2012).*
International Search Report and Written Opinion in PCT Appl. No. PCT/US2021/013630 dated Mar. 29, 2021, 11 pages.
Gupta et al., "A short survey on bloom filter and its variants," 2017 International Conference on Computing, Communication and Automation (ICCCA), IEEE, May 5, 2017, pp. 1086-1092.

\* cited by examiner

THREE-DIMENSIONAL PROBABILISTIC DATA STRUCTURE

BACKGROUND

Technical Field

This disclosure relates generally to database systems and, more specifically, techniques for implementing probabilistic data structures.

Description of the Related Art

Modern database systems routinely implement management systems that enable users to store a collection of information in an organized manner that can be efficiently accessed and manipulated. In some cases, these management systems maintain a log-structured merge-tree (LSM tree) having multiple levels that each store information as key-value pairs. An LSM tree usually includes two high-level components: an in-memory cache and a persistent storage. In operation, a database system includes a database node that initially writes database records into its in-memory cache before later flushing them to a persistent storage. That database node may receive a request for a database record associated with a particular database key. In many cases, there is no database record stored in its in-memory cache that is associated with the particular database key.

Figure 1:
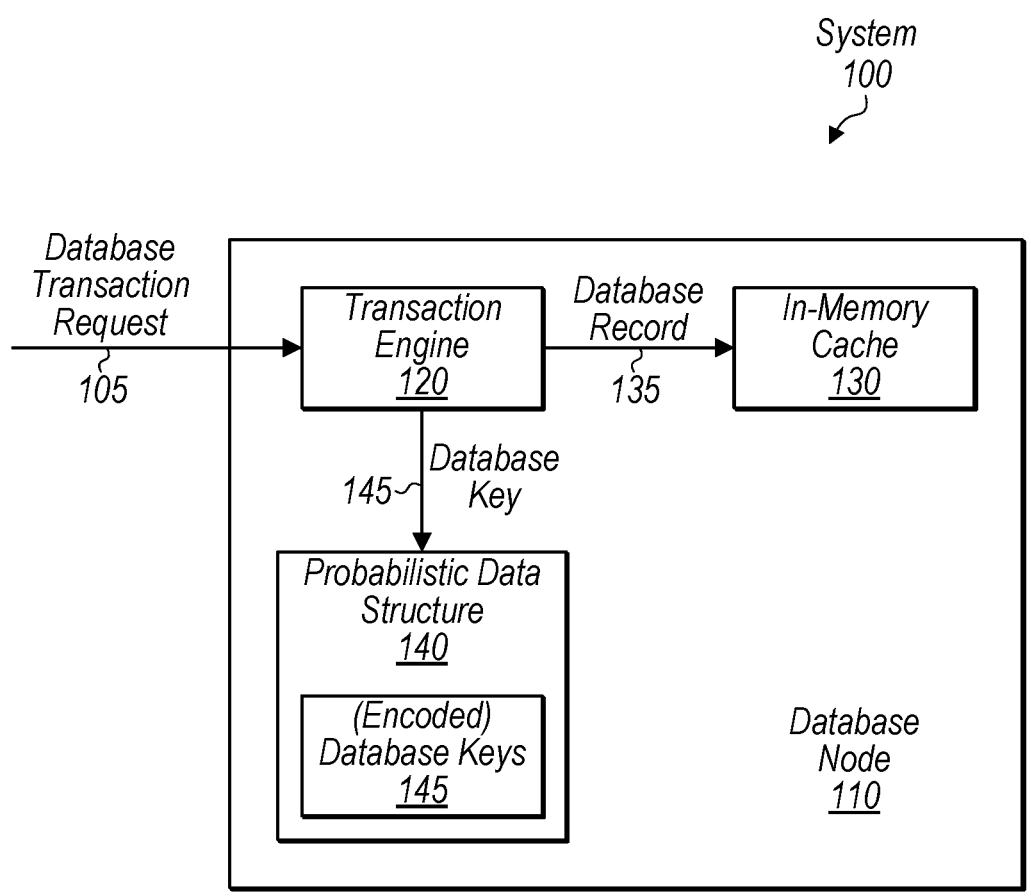
FIG. 1 is a block diagram illustrating example elements of a system having a database node that includes a probabilistic data structure, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "network interface configured to communicate over a network" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having eight processing cores, the terms "first" and "second" processing cores can be used to refer to any two of the eight processing cores. In other words, the first and second processing cores are not limited to processing cores 0 and 1, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

In some implementations of a database system, the database system includes multiple database nodes that are capable of processing transactions in which they write database records to their own local in-memory cache before flushing them to a persistent storage that is shared among the database nodes. In many cases, one database node needs to obtain the latest version of a database record and thus issues requests to another database node to determine if the latest version of the record is located in that other database node's cache. It is often the case that the record is not in that other node's cache and thus the requesting node wastes network bandwidth sending the request to the other node.

In some cases, probabilistic data structures, such as Bloom filters, can be used to reduce the number of requests between database nodes as they may provide information on whether a record for a particular database key exists at a database node's cache. As used herein, the term "probabilistic data structure" refers to a data structure that stores information indicating that a particular item either does not exist or might exist at a particular location within a system. For example, a probabilistic data structure can store information that indicates that a record, for a particular database key, does not exist or might exist at an in-memory cache of a database node. The present inventors have recognized that current approaches for implementing probabilistic data structures are deficient for various reasons. First, known probabilistic data structures cannot be checked for database keys in a parallel manner, but instead must be checked in a serial manner. For example, a probabilistic data structure may store database keys in a tree structure. In order to check for the existence of a particular database key, branches (e.g., linked lists) of the tree structure have to be traversed serially (e.g., by traversing through a linked list). Second, known probabilistic data structures are designed for exact key lookups but are not efficient for either open-range or closed-range key lookups. Third, known probabilistic data structure are not memory efficient relative to the false positive rate that they provide when performing key lookups.

The present disclosure describes various techniques for implementing a probabilistic data structure in a manner that overcomes some or all of the downsides of prior approaches. In various embodiments that are described below, a database node maintains a set of probabilistic data structures, each of which includes a three-dimensional data structure comprising multiple bitmaps that are stacked to form a hierarchy of levels capable of encoding database keys—in some cases, the bitmaps may not be stacked to create the three-dimensional data structure. The bitmap within a "level" of the three-dimensional data structure may correspond to a radix-by-radix matrix whose intersections can be used to store information about a transition between successive characters of a database key. Accordingly, in various embodiments, a database key is encoded in a probabilistic data structure by storing information about the transitions between the series of characters that make up that database key. (Throughout the present disclosure, the terms "insert" and "encode" are used interchangeably when describing the notion of storing information about a database key in a probabilistic data structure). Consider an example in which the database key "SLOT" is to be inserted into a probabilistic data structure. When inserting that database key, the database node may use at least three levels of the hierarchy: one level to store information about the transition S→L; another level to store information about the transition L→O; and yet another level to store information about the transition O→T. In some cases, additional levels may be used to store information about a transition from a root character to the first character of a database key and about a transition to a terminal character from the last character of the database key.

To determine whether a database key has been encoded in a probabilistic data structure, the database node may check the different levels of the three-dimensional data structure for information that corresponds to the transitions between the series of characters that make up that database key. Continuing the previous example, if a database node wanted to determine whether the database key "SLOT" had been encoded in a probabilistic data structure that that node had received, the database node may check, for example, the third level (or another level depending on the implementation) for information about the transition O→T. If the third level did not store information about that transition, then the database node may determine that the database key was not encoded. In various embodiments, this check for whether a database key was encoded can be performed in a parallel manner in which a database node checks each level of the probabilistic data structure at relatively the same time.

In some cases, when inserting multiple database keys into a probabilistic data structure, certain information may be lost. Consider an example in which the keys "ROOM" and "SLOT" have already been encoded in a probabilistic data structure. If a database node checks for the database key "ROOT," the database node will incorrectly determine that the database key was encoded. This results because there are three transitions in the key "ROOT": R→O, O→O, and O→T. Individually, each transition would be present in the data structure—the transition R→O would be set because of "ROOM," the transition O→O would be set because of "ROOM," and the transition O→T would be set because of "SLOT"—and thus a false positive would result for a lookup on the database key "ROOT." Accordingly, the information that may be lost when the transitions of a particular database key are encoded is that those transitions are associated with that particular database key.

To remedy this issue, in various embodiments, lineage information is maintained for a given transition that identifies one or more lineages that each correspond to a set of characters from which that transition "descended." Consider an example in which database keys "SLOT" and "ROOT" are inserted in the probabilistic data structure. Lineage information may be stored for the transition O→T that identifies two lineages: a lineage [RO] from "ROOT" and a lineage [SL] from "SLOT." Continuing the earlier example that included the false positive, the lineage information might indicate that the lineage [L] exists for the transition O→T—the complete lineage of [SLO] may not be stored in some cases. Thus, when a database node checks for the existence of the transition O→T for "ROOT," the database node will see that the transition O→T was set but it was set for the lineage [L] from "SLOT" and not [O] from "ROOT." As such, maintaining lineage information in this manner may reduce the number of false positives that occur.

After inserting a threshold number of database keys into a probabilistic data structure, a database node may provide the probabilistic data structure to another database node. Before providing the probabilistic data structure to the other database node, in various embodiments, the original database node performs a compression operation on the probabilistic data structure to reduce the data structure's memory footprint. When a probabilistic data structure is initially created, the database node may allocate a fixed amount of memory for the bitmap of each level of the probabilistic data structure. In some cases, after inserting the database keys, the database node may determine that the memory for certain levels was over allocated. Consequently, the database node may compress those levels. For example, if all the database keys share a common portion (e.g., an organization ID) and thus a set of common transitions, then the database node may replace the bitmaps with information that is in a different format that specifies that set of common transitions. After the other database node receives the probabilistic data structure, the other database node may use the probabilistic data structure to determine whether to request a record for a particular database key from the original database node.

These techniques may be advantageous over prior approaches as these techniques allow for a probabilistic data structure to be implemented that can be checked for database keys in a parallel manner and that can be compressed to reduce the memory footprint of the probabilistic data structure. Furthermore, as described in more detail below, these techniques allow for the implementation of a probabilistic data structure that provides more efficient range lookups than previous approaches. As a result of these techniques, a database node may be able to process database transactions at a quicker rate than previous approaches. An exemplary application of these techniques will now be discussed, starting with reference to FIG. 1.

Turning now to FIG. 1, a block diagram of a system 100 is shown. System 100 includes a set of components that may be implemented via hardware or a combination of hardware and software routines. In the illustrated embodiment, system 100 includes a database node 110 that comprises a transaction engine 120, an in-memory cache 130, and a probabilistic data structure 140. As shown, probabilistic data structure 140 includes encoded database keys 145. In some embodiments, system 100 may be implemented differently than shown. For example, system 100 may include multiple database nodes 110 in communication, one or more databases (which may implement a distributed storage), and/or other components, such as an application server, that interact with database node 110.

System 100, in various embodiments, implements a platform service that allows users of that service to develop, run, and manage applications. As an example, system 100 may be a multi-tenant system that provides various functionality to a plurality of users/tenants hosted by the multi-tenant system. Accordingly, system 100 may execute software routines from various, different users (e.g., providers and tenants of system 100) as well as provide code, web pages, and other data to users, databases, and other entities associated with system 100. As illustrated, system 100 includes database node 110 that may store and access data for users associated with system 100.

Database node 110, in various embodiments, is hardware, software, or a combination thereof capable of providing database services, such as data storage, data retrieval, and/or data manipulation. The database services may be provided to other components within system 100 or to components external to system 100. As illustrated, database node 110 receives a database transaction request 105—this request might be received from an application server (not shown) that is attempting to access a set of database records 135. As an example, database transaction request 105 may specify an SQL SELECT command that selects one or more rows from one or more database tables. The contents of a row may be specified in a database record 135 and therefore database node 110 may return one or more database records 135 to the requestor that correspond to the selected one or more table rows. In some cases, a database transaction request 105 may instruct a database node 110 to write one or more database records 135. Accordingly, in various embodiments, database node 110 initially writes database records 135 to in-memory cache 130 before flushing those database records to a database. In various embodiments, that database is shared with other database nodes 110 that may access database records 135 flushed by database node 110.

Transaction engine 120, in various embodiments, is a set of software routines that are executable to process database transactions that can involve inserting database records 135 into in-memory cache 130 and corresponding database keys 145 into probabilistic data structures 140. When a database record 135 is written into in-memory cache 130 as part of processing a database transaction, in various embodiments, transaction engine 120 inserts (or encodes) the corresponding database key 145 into probabilistic data structure 140 as shown. In some cases, instead of inserting the database key 145 when the database record 135 is written to in-memory cache 130, transaction engine 120 may perform a bulk insertion of database keys 145 for the database transaction before initiating a transaction commit—in some cases, the bulk insertion may be performed as part of a pre-commit phase in which database node 110 performs a set of actions before finally committing the database transaction.

In-memory cache 130, in various embodiments, is a buffer that stores data in memory (e.g., random access memory (RAM)) of database node 110. HBase™ Memstore may be an example of an in-memory cache 130. As mentioned, database node 110 may initially write a database record 135 (e.g., in the form of a key-value pair) in its in-memory cache 130. In some cases, the latest/newest version of a row in a database table may be found in a database record 135 that is stored at in-memory cache 130. Database records 135, however, that are written to database node 110's in-memory cache 130 are not visible to other database nodes 110 in some embodiments. That is, other database nodes 110 do not know, without asking, what information is stored within in-memory cache 130 of database node 110. In order to determine whether an in-memory cache 130 is storing a database record 135 associated with a particular database key 145, in various cases, another database node 110 may issue a database record request (not shown) to database node 110. Such a request may include the particular database key 145 and database node 110 may return a database record 135 if one exists at in-memory cache 130 that corresponds to that key.

In various cases, database node 110 may return a database record response to the other database node 110 where that response does not include a database record 135. This may be because, in various embodiments, in-memory cache 130 is relatively small in size (e.g., 2 GB) and, as a result, the chance of a database record 135 corresponding to a particular key being in in-memory cache 130 may be relatively low. Accordingly, in various embodiments, database node 110 generates probabilistic data structures 140 and provides them other database nodes 110—this may reduce the amount of database record requests that it receives from those other database nodes 110. An example interaction between two database nodes 110 is discussed in greater detail with respect to FIG. 5.

Probabilistic data structure 140, in various embodiments, is a data structure that stores information that is indicative of a probability that a database record 135 exists in an in-memory cache 130 for a corresponding database key 145. Probabilistic data structure 140 may include a three-dimensional data structure that comprises a hierarchy of bitmaps that are each capable of storing information about the transitions between successive characters within database keys 145. An example representation of the three-dimensional data structure is discussed in greater detail with respect to FIG. 3B. In some embodiments, the bitmaps correspond to radix-by-radix matrixes in which a given intersection between two characters can be used to store information corresponding to a transition between those two characters in a database key 145. An example layout of a bitmap is discussed in greater detail with respect to FIG. 3A.

As mentioned, database node 110 may receive a database transaction request 105 that specifies a transaction that involves writing one or more database records 135 to its in-memory cache 130. In various cases, a database record 135 may be associated with a database key 145 that comprises a series of characters—examples of database keys 145 are discussed in greater detail with respect to FIG. 2. Subsequent to writing a database record 135 to in-memory cache 130, in various embodiments, database node 110 inserts a corresponding database key 145 into probabilistic data structure 140. To insert that database key 145 into probabilistic data structure 140, database node 110 may store information in different levels of the three-dimensional data structure that pertains to the transitions between successive characters of that database key 145. In some embodiments, database node 110 starts at the top level and stores an indication of a transition from a root character to the first character of database key 145. Database node 110 may proceed down through the levels, storing, in each subsequent level, an indication of the next transition between successive characters of database key 145. As a result, each transition of database key 145 may be stored in a separate level of the three-dimensional data structure.

Figure 4:
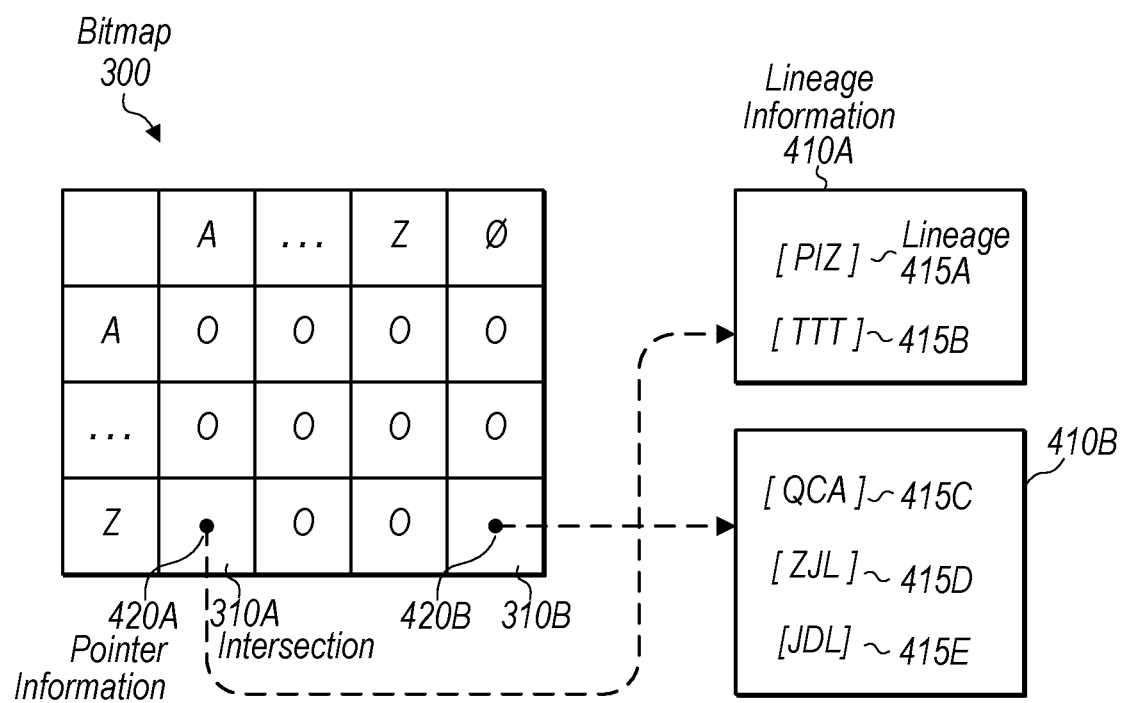
FIG. 4 is a block diagram illustrating example elements of lineage information having lineages, according to some embodiments.

As discussed in greater detail with respect to FIG. 4, in some embodiments, information about which database keys 145 correspond to a transition is maintained in association with the corresponding indication for that transition. The information may identify one or more lineages associated with a transition between successive characters—a lineage may specify a series of characters of a corresponding database key that precede the transition. Accordingly, in various cases, if two database keys 145 share a common transition at the same point in their series of characters, then two lineages may be stored that each specify, for a respective one of the two database keys 145, the characters of that database key that preceded that transition. This lineage information may be stored in probabilistic data structure, but separate from the three-dimensional data structure.

In various embodiments, database node 110 provides probabilistic data structure 140 to another database node 110 to enable that other database node 110 to determine whether to request a database record 135 from in-memory cache 130. The other database node 110 may check probabilistic data structure 140 to determine the corresponding database key 145 for that database record has been encoded in probabilistic data structure 140. If the database key 145 appears to have been encoded, then the other database node 110 may request a database record 135 for that database key. An example of this process is discussed in greater detail with respect to FIG. 5.

Figure 2:
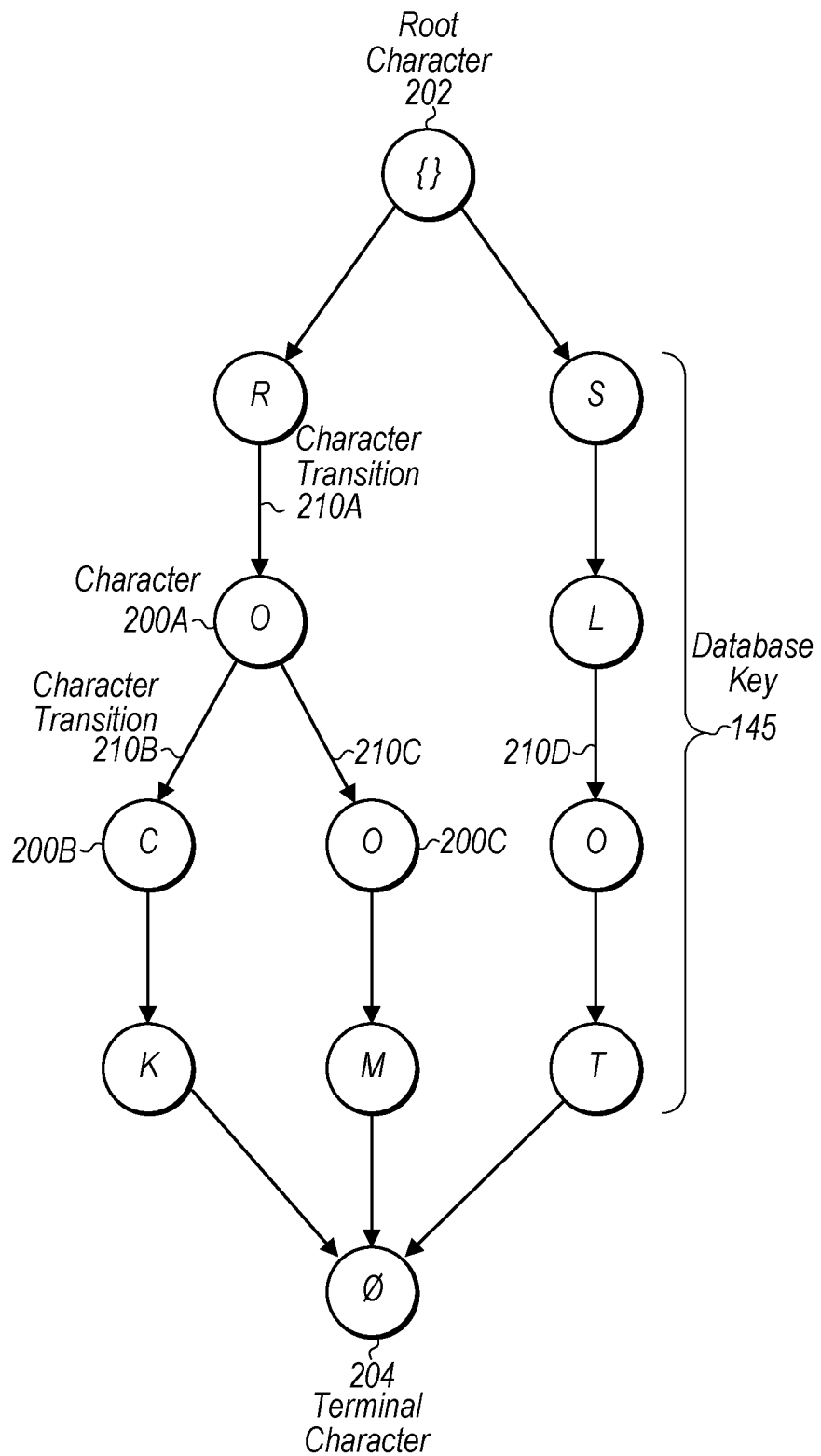
FIG. 2 is a block diagram illustrating example elements of database keys, according to some embodiments.

Turning now to FIG. 2, a block diagram of example database keys 145 is shown. In the illustrated, database keys 145 "ROCK," "ROOM," and "SLOT" are linked to a root character 202 and a terminal character 204 to form a "trie" of database keys 145. In some embodiments, database keys 145 may not be linked to root character 202 or terminal character 204. In some embodiments, the trie of database keys 145 may be implemented differently than shown. For example, the trie of database keys 145 might include different database keys 145, more or less database keys 145, database keys 145 of different length, etc.

As depicted, database keys 145 each comprise a respective series of characters 200. As a result, there are character transitions 210 between successive characters 200 in the series of characters 200 that form those database keys 145. In some cases, database keys 145 may share a common character transition 210 that occurs at the same position in their series of characters 200. For example, as shown, database keys "ROCK" and "ROOM" share a common character transition 210A (R→O). As discussed in greater detail below, the same information (e.g., a bit set in a bitmap of probabilistic data structure 140) may be used to represent transition 210A in both database keys "ROCK" and "ROOM." The same transition 210 may occur in two or more database keys 145, however, that transition may occur at different positions within their series of characters 200. As an example, the transition T→A may occur towards the start of database key "001TA1IAE34" but towards the end of database key "001LK3IETA3." As discussed in greater detail below, information may be stored in one level of probabilistic data structure 140 that is representative of the transition T→A in database key "001TA1IAE34" and information may be stored in another level that is representative of the transition T→A that also occurs in database key "001LK3IETA3"

Figure 3A:
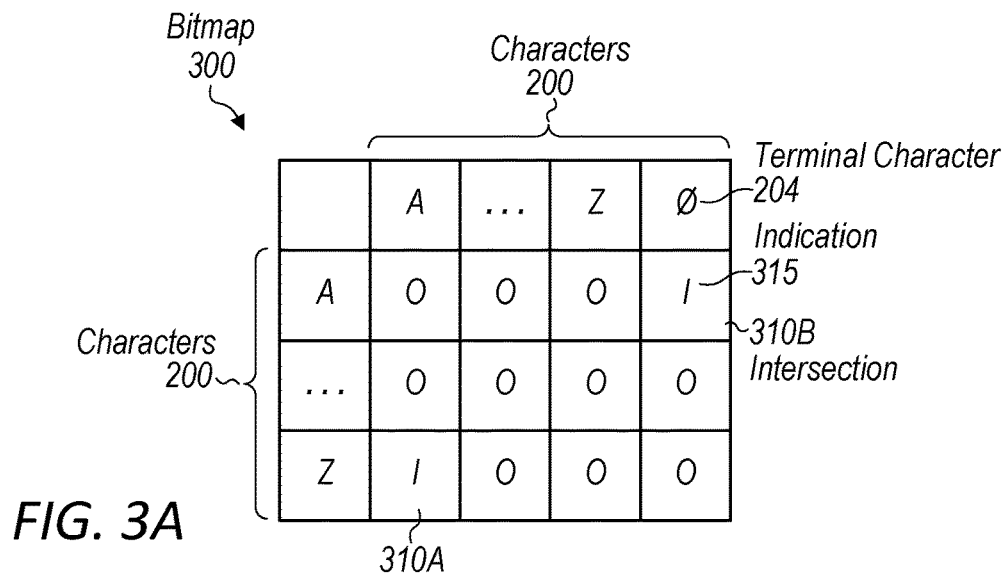
FIG. 3A-3C are block diagrams illustrating example elements of a probabilistic data structure having levels that include bitmaps, according to some embodiments.

Turning now to FIG. 3A, a block diagram of an example bitmap 300 is depicted. In the illustrated embodiment, bitmap 300 corresponds to a character-by-character matrix comprising multiple intersections 310 that are each defined by the intersection of two respective characters 200. As further illustrated, the characters 200 of one dimension of the matrix include terminal character 204. In some embodiments, bitmap 300 may be implemented differently than shown. For example, one dimension of the matrix may correspond to root character 202 as depicted in FIG. 3C.

As discussed, a database key 145 includes a series of character transitions 210 between successive characters 200 in the series of characters 200 defining that database key. In various embodiments, a database key 145 is encoded into a probabilistic data structure 140 by storing information about the character transitions 210 of that database key 145 in a bitmap 300. With the illustrated embodiment in mind, consider an example in which a character transition 210 Z→A of a database key 145 "PIZZA" is being encoded in bitmap 300. To encode that character transition 210, transaction engine 120 may store an indication 315 of that character transition 210 at intersection 310A. As illustrated, intersection 310A corresponds to the intersection of characters "A" and "Z"—note that characters 200 on the left side of the matrix may correspond to the beginning character of a character transition 210 while characters 200 on the top side of the matrix correspond to the ending character. An indication 315, in various embodiments, is a bit value that is set to indicate the occurrence of a character transition 210. As shown, a bit value of "1" is set at intersection 310A to indicate the occurrence of character transition 210 Z→A. As discussed in greater detail with respect to FIG. 4, indication 315 may correspond to lineage information or a pointer that points to lineage information.

In some embodiments, when encoding a database key 145, transaction engine 120 may store, in bitmap 300, an indication 315 of a character transition 210 between the last character 200 of that database key and terminal character 204. This may reduce the false positive rate of probabilistic data structure 140 as probabilistic data structure 140 can be encoded with database keys 145 of different length. With the illustrated embodiment in mind, consider an example in which a terminal character transition 210 of a database key 145 "JFDLIA" is being encoded in bitmap 300. Transaction engine 120 may store an indication 315 of that transition 210 A→Ø at intersection 310B as shown.

Figure 3B:
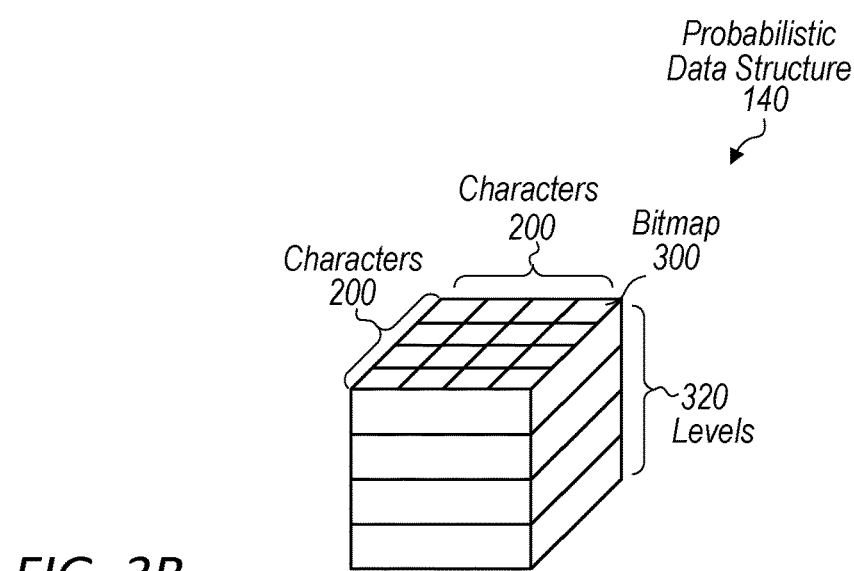
Figure 3C:
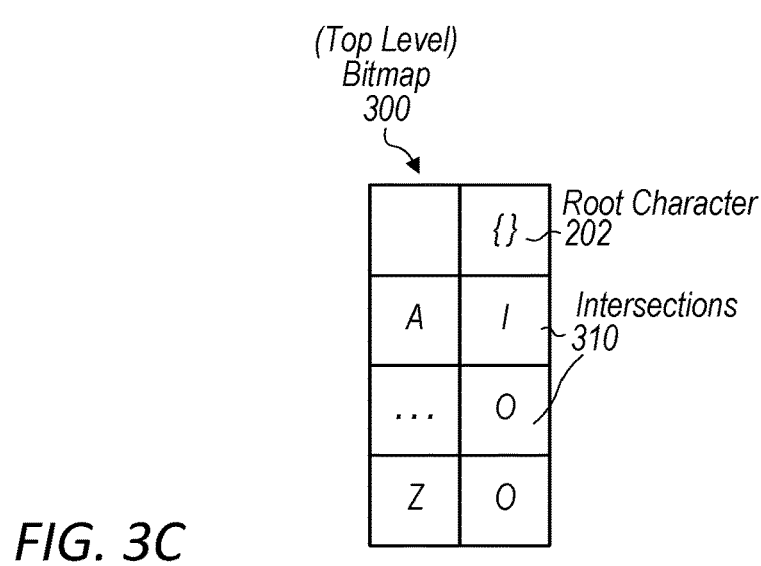

Turning now to FIG. 3B, a block diagram of an example probabilistic data structure 140 is shown. In the illustrated embodiment, probabilistic data structure 140 includes bitmaps 300 that define a series of levels 320 that form a three-dimensional structure. In some embodiments, probabilistic data structure 140 may be implemented differently than shown. As an example, the top level of probabilistic data structure 140 may be a root character-by-character matrix as shown in FIG. 3C.

As discussed, a database key 145 includes a series of character transitions 210. These character transitions 210 may form an ordering where each successive character transition 210 corresponds to a successive level 320 included in probabilistic data structure 140. Accordingly, when encoding a database key 145, in various cases, multiple levels 320 may be used to store indications 315 of the character transitions 210 of the database key 145. Consider an example in which the database key 145 "ABC" is being encoded. The bitmap 300 of the first, top level 320 may store an indication 315 of the character transition 210 { }→A, the bitmap 300 of the next, second level 320 may store an indication 315 of the character transition 210 A→B, the bitmap 300 of the third level 320 may store an indication 315 of the character transition 210 B→C, and the bitmap 300 of the fourth level 320 may store an indication 315 of the character transition 210 C→Ø. In some embodiments, character transitions 210 from root character 202 or to terminal character 204 may not be stored.

When encoding a database key 145 that involves storing indications 315 within bitmaps 300 of multiple, different levels 320, in various embodiments, transaction engine 120 may store those indications 315 in a parallel manner. That is, instead of initially storing an indication 315 of the first character transition 210 and then proceeding to store an indication 315 of the second character transition 210 of a particular database key 145, transaction engine 120 may store both of those indications 315 at relatively the same time (i.e., in parallel). Continuing the previous example, transaction engine 120 may write indications 315 for all four character transition 210 to bitmaps 300 in parallel.

Turning now to FIG. 3C, a block diagram of an example top level bitmap 300 is shown. In the illustrated embodiment, bitmap 300 corresponds to a character-by-character matrix that comprises multiple intersections 310 that are defined by the intersection of a character 200 and root character 202. In various embodiments, transaction engine 120 may store indications 315 of character transitions 210 between root character 202 and the starting character 200 of each database key 145 encoded. As such, the bitmap 300 of the top level 320 that is included in the three-dimensional structure of probabilistic data structure 140 may correspond to the illustrated bitmap 300.

Turning now to FIG. 4, a block diagram of example lineage information and bitmap 300 is shown. In the illustrated embodiment, bitmap 300 includes intersections 310A and 310B that store pointer information 420A and 420B, respectively. As further shown, lineage information 410A includes lineages 415A and 415B, and lineage information 410B includes lineages 415C and 415D. In some embodiments, bitmap 300 and lineage information 410A and 410B may be implemented differently than shown. As an example, lineages 415 may be include more or less characters 200.

As mentioned, when encoding database keys 145, certain information may be lost about which database key 145 caused an indication 315 to be stored. Consider an example in which transaction engine 120 performs a database key lookup for a database key 145 "LTTZA" that involves checking for the character transition 210 Z→A in bitmap 300 of FIG. 3A. As shown in FIG. 3A, an indication 315 is set for the character transition 210 Z→A but it may not be clear if that indication 315 was set for database key 145 "LTTZA" or another database key 145, such as "PIZZA." Accordingly, in various embodiments, lineage information 410 may be stored in association with a character transition 210 to identify database keys 145 (or a portion of them) that were encoded into probabilistic data structure 140 and were associated with that character transition.

Lineage information 410, in various embodiments, identifies lineages 415 for character transitions 210. A lineage 415, in various embodiments, identifies one or more characters 200 that preceded a character transition 210 and is associated with a corresponding database key 145. Consider the illustrated embodiment for example. As depicted, intersection 310A (which corresponds to character transition 210 Z→A) includes pointer information 420A that points to lineage information 410A. Lineage information 410A includes two lineages 415A and 415B for the character transition 210 Z→A. Lineage 415A identifies a lineage of [PIZ] and lineage 415B identifies a lineage of [TTT]. Accordingly, lineages 415A and 415B may indicate that database keys 145 "PIZZA" and "TTTZA" were encoded in probabilistic data structure 140—as discussed below, lineages 415 may specify a predefined number of characters 200 that does not include all characters 200 that preceded a character transition 210. As a result, if transaction engine 120 checks the character transition 210 Z→A in bitmap 300 of FIG. 4 as part of a lookup for a database key 145 "LTTZA," then transaction engine 120 may determine that database key 145 "LTTZA" was not encoded.

In various embodiments, transaction engine 120 may store lineage information 410 for each character transition 210 that is set in a bitmap 300. As shown, for example, intersections 310A and 310B for character transitions 210 Z→A and Z→Ø include pointer information 420A and 420B to lineage information 410A and 410B, respectively. In some embodiments, lineage information 410A and 410B are stored at separate locations while, in other embodiments, they are stored at the same location. In some embodiments, instead of storing lineages 415 as series of characters 200, lineages 415 are stored as hash values that are derived by performing a hash function on the series of characters 200. For example, instead of storing [PIZ] for lineage 415A, a hash value derived by hashing [PIZ] may be stored for lineage 415A. In some embodiments, if a number of lineages 415 associated with a character transition 210 does not satisfy a defined threshold (e.g., more than three), then those lineages 415 may be stored in bitmap 300 instead of separately. Accordingly, in some cases, a hash value of certain lineages 415 may be stored at an intersection 310 in place of pointer information 420 for the associated character transition 210.

As discussed, a probabilistic data structure 140 may include multiple bitmaps 300 that define a hierarchy of levels 320 that forms a three-dimensional structure. Accordingly, lineage information 410 may be specific to a character transition 210 in a bitmap 300 of a specific level 320 of the three-dimensional structure. As an example, the character transition 210 Z→A may be set in two different bitmaps 300 of different levels 320. The lineage information 410 that is associated with that character transition may be different for each bitmap 300. That is, pointer information 420 in a bitmap 300 of a first level 320 may point to lineage information 410 that includes a lineage 415 [OOZ] while pointer information 420, for the same character transition 210, but in a bitmap 300 of a second, different level 320 may point to lineage information 410 that includes a lineage 415 [KLZ].

The amount of information that is included in a lineage 415 may vary depending on the lineage sampling scheme that is used. Various lineage sampling schemes are discussed below and an exemplary database key 145 "AFDFJKL" is used to help facilitate these discussions. In some embodiments, a full lineage sampling scheme is used in which a lineage 415 corresponds to all characters 200 of a database key 145 that preceded a character transition 210 associated with the database key. For example, for character transition 210 K→L, a lineage 415 associated with "AFDFJKL" may specify [AFDFJ]. For character transition 210 D→F, a lineage 415 may specify [AF]. In some embodiments, a fixed-length lineage sampling scheme is used in which each lineage 415 consumes a maximum fixed-size of space (e.g., 524 KB). As such, in various cases, each lineage 415 specifies up to a maximum number of characters 200. As an example, for character transition 210 K→L, a lineage 415 associated with "AFDFJKL" may specify [FJ] and, for character transition 210 D→F, a lineage 415 may specify [AF]. In some embodiments, a variable-length lineage sampling scheme is used in which lineages 415 of different groups of levels 320 consume different maximum fixed-sizes of space. As an example, lineages 415 that correspond to character transitions 210 A→F, F→D, and D→F may specify up to a maximum of two characters 200 while character transitions 210 F→J, J→K, and K→L may specify up to a maximum of four characters 200. That is, lineages 415 associated with character transitions 210 in the first half of levels 320 may specify up to a first limit of characters 200 while lineages 415 associated with character transitions 210 in the second half of levels 320 may specify up to a second limit of characters 200.

Figure 5:
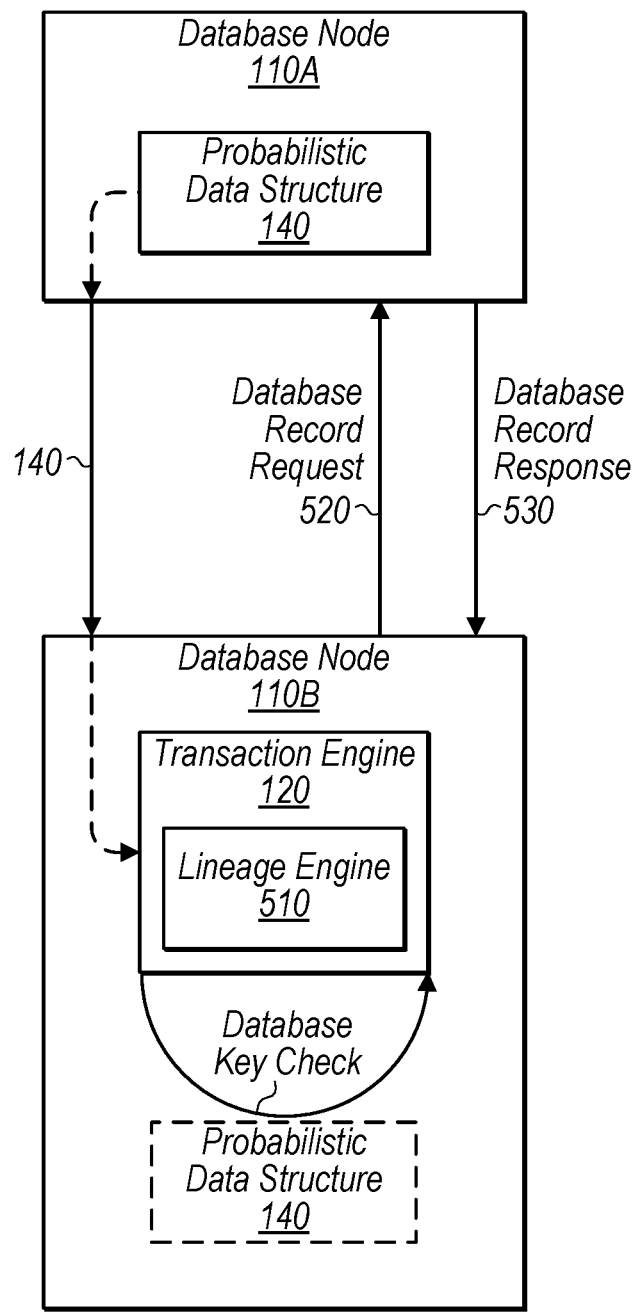
FIG. 5 is a block diagram illustrating example elements of interactions between database nodes having probabilistic data structures, according to some embodiments.

Turning now to FIG. 5, a block diagram of example interactions between two database nodes 110 is shown. In the illustrated embodiment, database node 110A includes probabilistic data structure 140, and database node 110B includes transaction engine 120 having a lineage engine 510. In some embodiments, database nodes 110 may be implemented differently than shown. As an example, database node 110B may include multiple probabilistic data structures 140 that it may share with database node 110A.

As mentioned previously, throughout the duration of its operation, database node 110A may receive database transaction requests 105 to perform database transactions. Performing a database transaction may involve writing database records 135 to an in-memory cache 130 of database node 110A. In addition to writing records 135 to in-memory cache 130, database node 110A may insert/encode database keys 145, which correspond to those database records, into a set of probabilistic data structures 140. Database node 110A may share one or more of those probabilistic data structures 140 with database node 110B. In various embodiments, database node 110A inserts database keys 145 into a probabilistic data structure 140 until a specified amount of keys have been inserted. Database node 110A may then create another probabilistic data structure 140 and continue inserting database keys 145.

Before providing a probabilistic data structure 140, in various embodiments, database node 110A performs a compression operation on the probabilistic data structure 140 to reduce its memory footprint. In some embodiments, when database node 110A creates a probabilistic data structure 140, database node 110A allocates a fixed amount of memory for each level 320 included in the probabilistic data structure 140—e.g., each bitmap 300 is allocated with a fixed amount of memory. During the compression operation, database node 110A may identify ways to compress one or more levels 320. In various instances, database keys 145 may share common character transitions 210—e.g., a set of database keys 145 may share common characters 200 that correspond to the same organization ID. As a result, the amount of information stored in bitmaps 300 (e.g., the number of bits set) that correspond to character transitions 210 of those common characters 200 may be limited (e.g., only one bit may be set). Accordingly, in various cases, database node 110A may replace those bitmaps 300 with information that is in a smaller, different format, such as a String object. That information may specify the character transitions 210 without using the matrix structure that may be included in bitmaps 300.

After compressing a probabilistic data structure 140 into a more space-efficient format, database node 110A may send that probabilistic data structure 140 to database node 110B. In some embodiments, probabilistic data structures 140 is included in a database record response 530 to a database record request 520. That is, database node 110B may send a database record request 520 to database node 110A for any database record 135 that corresponds to a particular database key 145. Database node 110A may return a database record response 530 that includes a database record 135 if database node 110A locates a database record 135 in its in-memory cache 130 that corresponds to the particular database key 145. As part of the response, database node 110A may include one or more "new" probabilistic data structures 140 that have not been provided to database node 110B. In some cases, database record response 530 may not include a database record 135, but only probabilistic data structures 140 if no database record 135 is found that corresponds to the specified database key 145.

In various cases, database node 110B may use probabilistic data structures 140 in order to determine whether to issue a database record request 520 for a database record 135. In order to make that determination, in various embodiments, database node 110B performs a database key lookup to determine whether a database key 145 corresponding to the database record 135 has been encoded in a probabilistic data structure 140. In some cases, database node 110B may perform a single-key lookup. In order to perform a single-key lookup, lineage engine 510 may be executed to calculate all lineages 415 for the relevant database key 145. Database node 110B may then perform a vectorized lineage check across all bitmaps 300 in the levels 320 that are relevant to that database key. The check across the bitmaps 300 may be performed in parallel. That is, database node 110B may check, in parallel, the bitmap 300 in each relevant level 320 to determine whether an indication 315 has been set for the expected character transition 210. If there is an indication 315 and it identifies lineage information 410, then database node 110B may check the lineages 415 specified in that information to determine if one of them matches the lineage 415 calculated by lineage engine 510 for the corresponding character transition 210. If database node 110B determines that a database key 145 has been encoded in a probabilistic data structure 140, then database node 110B may send a database record request 520 to database node 110A for a database record 135 that is associated with that database key 145.

In some cases, database node 110B may perform a database key range lookup. Database node 110B may initially perform a single-key lookup using the start database key 145 of the specified key range. If the start database key 145 has been encoded, then database node 110B may determine that the range is non-empty and may send one or more database record requests 520 to database node 110A for database records 135 associated with that key range. If the start database key 145 has not been encoded, then database node 110B may determine the longest common prefix between database keys 145 encoded in probabilistic data structure 140 and the start database key 145. To make that determination, database node 110B may proceed through the character transitions 210 of the start database key 145 until a character transition 210 of the start database key 145 is not set in probabilistic data structure 140. From the longest common prefix, database node 110B may determine the least database key 145 greater than the start key 145. To make that determination, if there exists a valid extension of the prefix by introducing a new character 200 that is lexicographically greater than the start key 145, then database node 110B may continually extend the prefix (by adding characters 200) until the terminal character 204 is reached to form a key 145. If there does not exist a valid extension, then database node 110B may truncate the prefix by one least significant character 200 and then may repeat the prior extension process to form a key 145 until either a key 145 is formed or the prefix is empty of characters 200. If the least key 145 greater than the start key 145 is less than or equal to the end key 145 of the specified key range, then database node 110B may determine that the range is non-empty and may send one or more database record requests 520 to database node 110A for database records 135 associated with that key range.

Figure 6:
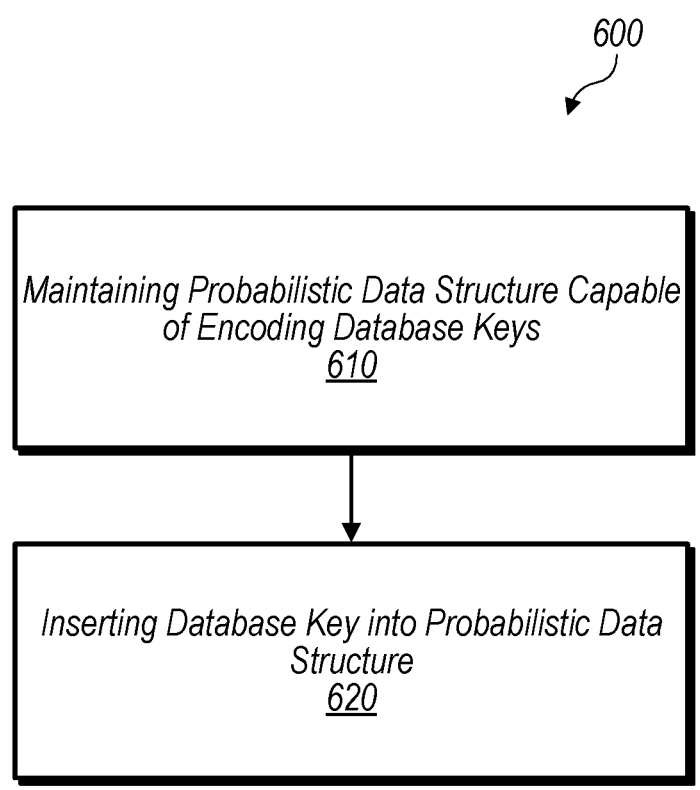
FIGS. 6 and 7 are flow diagrams illustrating example methods relating to maintaining a probabilistic data structure, according to some embodiments.

Turning now to FIG. 6, a flow diagram of a method 600 is shown. Method 600 is one embodiment of a method performed by a database node (e.g., a database node 110) to maintain a probabilistic data structure (e.g., a probabilistic data structure 140). In some embodiments, method 600 may include additional steps than shown. As an example, the database node may receive a transaction request (e.g., a transaction request 105) that specifies a transaction that involves writing a set of database records to an in-memory cache (e.g., an in-memory cache 130) of the database node.

Method 600 begins in step 610 with the database node maintaining a probabilistic data structure capable of encoding database keys (e.g., database keys 145). In various embodiments, the probabilistic data structure includes a plurality of levels (e.g., levels 320), each of which is capable of storing an indication (e.g., an indication 315) of a transition (e.g., a transition 210) between successive characters (e.g., characters 200) in a given database key.

In step 620, the database node inserts a database key into the probabilistic data structure. The database key comprises a series of characters. Accordingly, when inserting the database key, the database node may store, for each transition between successive ones of the series of characters, an indication in a corresponding level of the plurality of levels (e.g., the first transition may be stored in the top level) that is indicative of that transition. In some cases, the database node may store, in a corresponding level of the plurality of levels (e.g., a bottom level), an indication indicative of a transition from a last character of the series of characters to a terminal character (e.g., a terminal character 204) separate from the series of characters.

In some cases, a particular indication may be stored for a transition between particular successive characters of the database key and lineage information (e.g., lineage information 410) may be maintained, in association with the particular indication, that specifies a set of database key lineages (e.g., lineages 415). A given database key lineage may identify one or more characters that precede a given transition (e.g., the lineage [SLO] for the transition "O"→"T" of "SLOT") between successive characters of a corresponding database key. In various embodiments, the lineage information is stored separately from the plurality of levels that include the particular indication. Accordingly, the particular indication may be a pointer (e.g., pointer information 420) that identifies a location where the lineage information is stored. In some embodiments, each database key lineage that is maintained in association with the probabilistic data structure identifies the same number of characters (i.e., the same character length). In some cases, the particular indication corresponds to at least two different database keys that have been inserted into the probabilistic data structure. Accordingly, the set of database key lineages may include a respective database key lineage for each of the at least two different database keys.

The database node may send, to a second database node, the probabilistic data structure to enable the second database node to determine whether to request a database record from the database node. The database node may also receive, from the second database node, a second probabilistic data structure that enables the database node to determine whether to request a database record from the second database node. Accordingly, the database node may determine whether to request a database record for a particular database key by determining whether the second probabilistic data structure includes levels that store indications that are indicative of transitions between successive characters included in the particular database key. In response to determining that the second probabilistic data structure includes levels storing indications that are indicative of the transitions between successive characters included in the particular database key, the database node may send a request to the second database node for a database record associated with the particular database key. Determining whether to request a database record may further include calculating a plurality of database key lineages that correspond to the transitions between successive characters included in the particular database key and comparing the plurality of database key lineages against database key lineages maintained in association with the indications.

Figure 7:
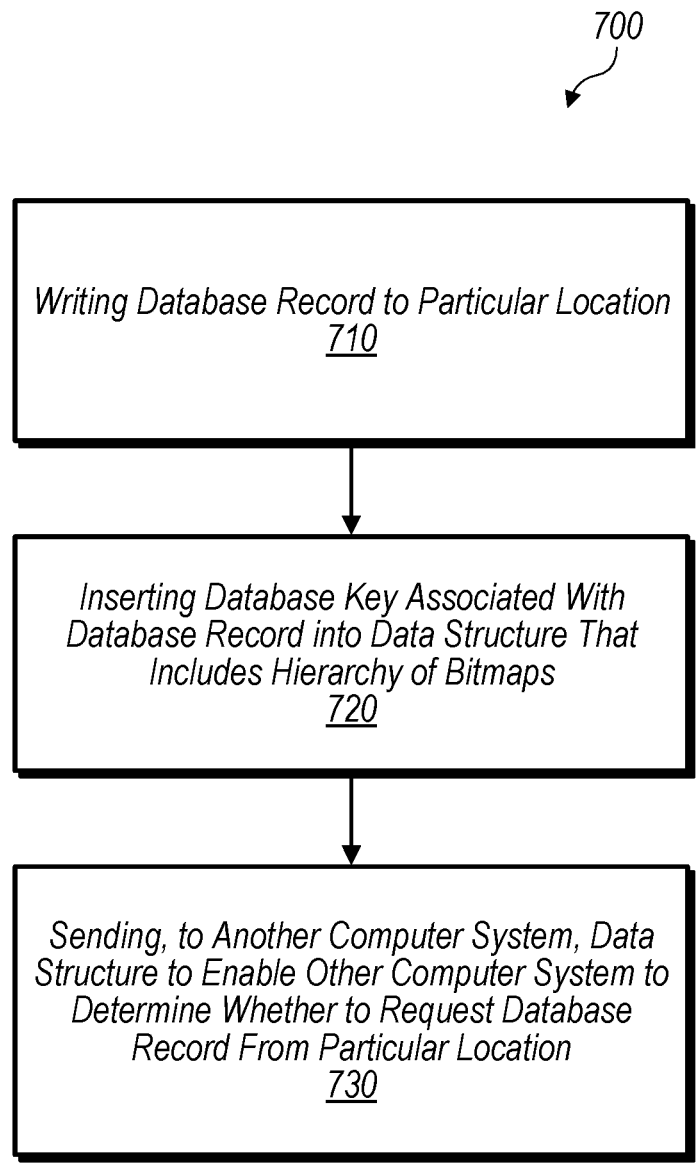

Turning now to FIG. 7, a flow diagram of a method 700 is shown. Method 700 is one embodiment of a method performed by a computer system (e.g., a database node 110) in order to maintain a data structure (e.g., a probabilistic data structure 140). Method 700 may be performed by executing a set of program instructions stored on a non-transitory computer-readable medium. In some embodiments, method 700 may include additional steps than shown. For example, the database node may receive a request (e.g., a transaction request 105) that specifies a transaction that involves writing a set of database records to an in-memory cache (e.g., an in-memory cache 130) of the database node.

Method 700 begins in step 710 with the computer system writing a database record (e.g., a database record 135) to a particular location (e.g., an in-memory cache 130).

In step 720, the computer system inserts a database key (e.g., a database key 145) that is associated with the database record into a data structure that includes a hierarchy of bitmaps (e.g., bitmaps 300). The database key comprises a series of characters. Inserting the database key may include, for a given transition (e.g., a transition 210) between successive ones of the series of characters (e.g., characters 200), storing data (e.g., indication 325) in a corresponding bitmap of the hierarchy that is indicative of the given transition. The data stored in the corresponding bitmap may identify lineage information (e.g., lineage information 410) specifying one or more lineages (e.g., lineages 415). Accordingly, inserting the database kay may include storing, in the lineage information, a lineage that is indicative of one or more characters that occur before the given transition in the series of characters. In some embodiments, the computer system performs a hash on the one or more characters that occur before the given transition to derive a hash value and stores the lineage in the lineage information as the hash value.

In step 730, sending, to another computer system, the data structure to enable the other computer system to determine whether to request a database record from the particular location. prior to inserting the database key into the data structure, allocating the data structure such that a particular bitmap in the hierarchy of bitmaps has a particular memory size; prior to sending the data structure to other computer system, performing a compression operation on the data structure, wherein the compression operation includes: determining that a memory size of data written to the particular bitmap does not consume a threshold amount of the particular memory size; and replacing the particular bitmap with particular data in another format, wherein the particular data is indicative of the data written to the particular bitmap. in response to inserting a threshold number of database keys into the data structure, creating a second data structure in which to insert subsequent database keys.

Figure 8:
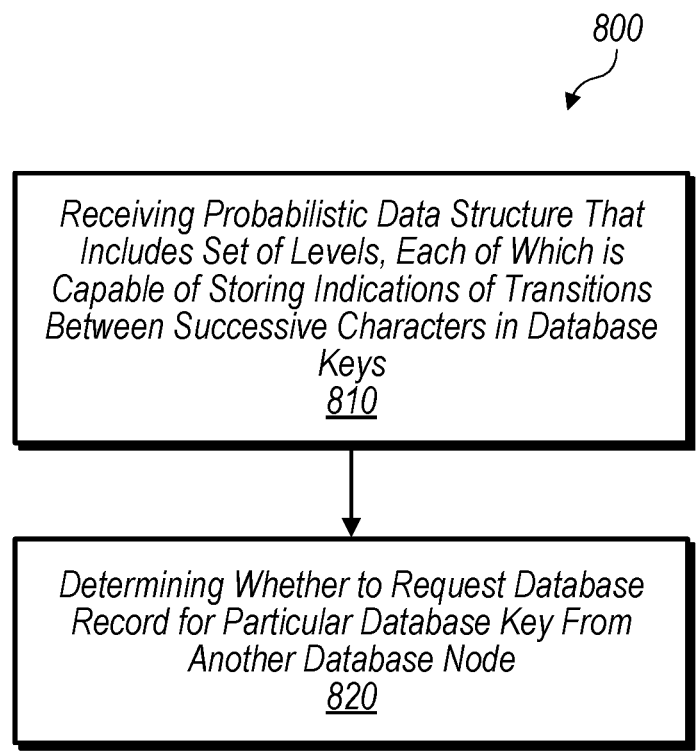
FIG. 8 is a flow diagram illustrating example methods relating to performing a lookup of a database key in a probabilistic data structure, according to some embodiments.

Turning now to FIG. 8, a flow diagram of a method 800 is shown. Method 800 is one embodiment of a method performed by a database node (e.g., a database node 110) in order to determine whether to request a database record (e.g., a database record 135) for a database key (e.g., database key 145) from another database node. In some embodiments, method 800 may include additional steps than shown. For example, the database node may generate and send a probabilistic data structure (e.g., a probabilistic data structure 140) to the other database node.

Method 800 begins in step 810 with the database node receiving a probabilistic data structure that includes a set of levels (e.g., levels 320), each of which is capable of storing indications (e.g., indications 325) of transitions (e.g., transitions 210) between successive characters (e.g., characters 200) in database keys In step 820, the database node determines whether to request a database record for a particular database key from another database node. The particular database key comprises a set of transitions between characters of the particular database key. Determining whether to request may include, for each transition of the set of transitions, determining whether a corresponding level of the set of levels includes an indication that is indicative of that transition. In some cases, a particular one of the set of transitions may be associated with a particular lineage (e.g., lineage 415) that specifies all characters of the particular database key that precede the particular transition. Accordingly, the database node may determine whether the particular lineage is included in a set of lineages identified by the probabilistic data structure for the particular transition. In some embodiments, each lineage of the set of lineages identifies, for a corresponding database key, all characters of the corresponding database key that precede the particular transition in the corresponding database key.

In response to determining that a particular level of the set of levels does not include an indication indicative of a corresponding transition of the set of transitions, the database node may access, from a distributed storage separate from the other database node, a database record for the particular database key.

In some cases, the database node may perform a database key range check to determine whether at least one database key within a database key range has been encoded into the probabilistic data structure. As such, for each transition of a set of transitions associated with a beginning key of the database key range, the database node may determine whether a corresponding level of the set of levels includes an indication that is indicative of that transition. In response to determining that the beginning key is not encoded in the probabilistic data structure, the database node may determine a longest prefix of the beginning key that has been encoded in the probabilistic data structure. The database node may then add one or more characters to the longest prefix that cause the longest prefix to be lexicographically greater than the beginning key. The database may determine whether the longest prefix with the added one or more characters has been encoded in the probabilistic data structure.

Exemplary Computer System

Figure 9:
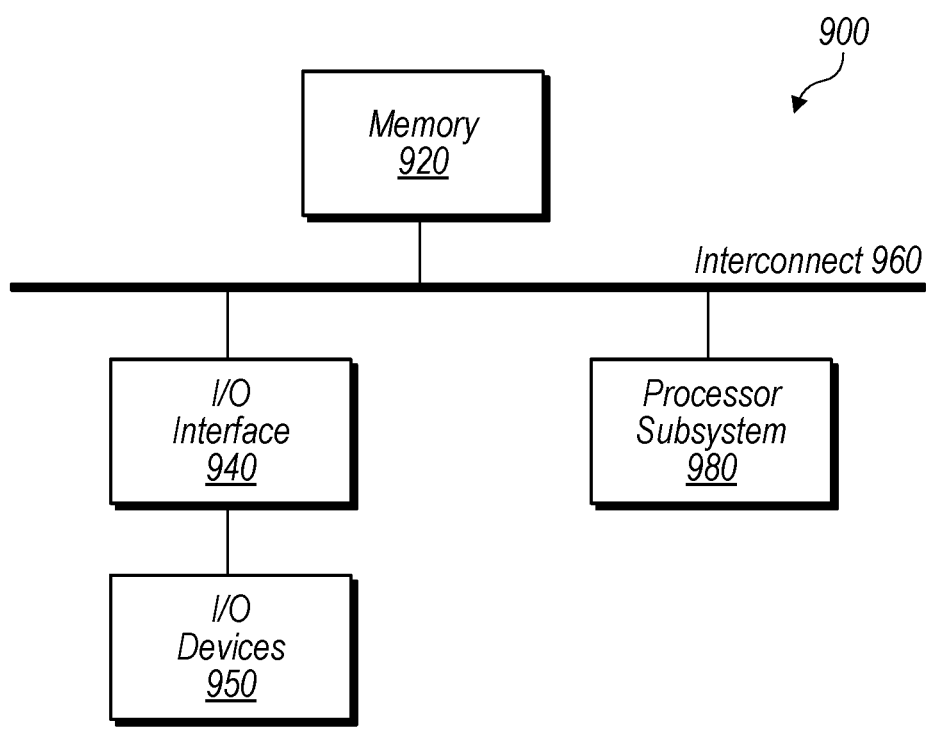
FIG. 9 is a block diagram illustrating an example computer system, according to some embodiments.

Turning now to FIG. 9, a block diagram of an exemplary computer system 900, which may implement database node 110, is depicted. Computer system 900 includes a processor subsystem 980 that is coupled to a system memory 920 and I/O interfaces(s) 940 via an interconnect 960 (e.g., a system bus). I/O interface(s) 940 is coupled to one or more I/O devices 950. Computer system 900 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 900 is shown in FIG. 9 for convenience, system 900 may also be implemented as two or more computer systems operating together.

Processor subsystem 980 may include one or more processors or processing units. In various embodiments of computer system 900, multiple instances of processor subsystem 980 may be coupled to interconnect 960. In various embodiments, processor subsystem 980 (or each processor unit within 980) may contain a cache or other form of on-board memory.

System memory 920 is usable store program instructions executable by processor subsystem 980 to cause system 900 perform various operations described herein. System memory 920 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 900 is not limited to primary storage such as memory 920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980. In some embodiments, program instructions that when executed implement transaction engine 120 and probabilistic data structure 140 may be included/stored within system memory 920.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices 950 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device 950 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   maintaining, by a database node, a data structure used to encode a plurality of database keys, wherein the data structure includes a plurality of levels, each of which includes a character-addressable matrix that encodes transitions between characters;
   inserting, by the database node, a database key into the data structure, wherein the database key comprises a series of characters with a plurality of transitions between two successive characters, wherein the inserting includes encoding the plurality of transitions across the plurality of levels such that different ones of the plurality of transitions are encoded in different ones of the plurality of levels, and wherein a given transition is encoded by setting, in a character-addressable matrix that corresponds to the given transition, an indication at a matrix location addressed using the two successive characters of the given transition; and
   maintaining, in association with the indication by the database node, lineage information that specifies a set of database key lineages, a given one of which specifies one or more characters of a particular inserted database key that precede the two successive characters that are also in that particular inserted database key.

2. The method of claim 1, wherein the lineage information is stored separately from the plurality of levels that include the indication, and wherein the indication is a pointer that identifies a location where the lineage information is stored.

3. The method of claim 1, wherein each database key lineage maintained in association with the data structure identifies a same number of characters.

4. The method of claim 1, wherein the indication, for the two successive characters, corresponds to at least two different database keys that have been inserted into the data structure.

5. The method of claim 4, wherein the set of database key lineages includes a respective database key lineage for each of the at least two different database keys.

6. The method of claim 1, further comprising:
   sending, by the database node to a second database node, the data structure to enable the second database node to determine whether to request a database record from the database node; and
   receiving, by the database node from the second database node, a second data structure that enables the database node to determine whether to request a database record from the second database node.

7. The method of claim 6, further comprising:
   determining, by the database node, whether to request a database record for a particular database key, wherein the determining includes:
      determining whether the second data structure includes levels that store indications that are indicative of transitions between successive characters included in the particular database key; and
      in response to determining that the second data structure includes levels storing indications that are indicative of the transitions between successive characters included in the particular database key, the database node sending a request to the second database node for a database record associated with the particular database key.

8. The method of claim 7, wherein the determining whether to request a database record further includes:
   calculating a plurality of database key lineages that correspond to the transitions between successive characters included in the particular database key; and
   comparing the plurality of database key lineages against database key lineages maintained in association with the indications.

9. The method of claim 1, wherein the inserting includes:
   storing, in a corresponding level of the plurality of levels, an indication that is indicative of a transition from a last character of the series of characters to a terminal character separate from the series of characters.

10. A non-transitory computer readable medium having program instructions stored thereon that are capable of causing a computer system to perform operations comprising:
    writing a database record to a particular location;
    inserting a database key associated with the database record into a data structure, wherein the database key comprises a series of characters with a plurality of transitions between two successive characters, wherein the data structure includes a plurality of levels, each of which includes a character-addressable matrix that is capable of encoding one of the plurality of transitions, and wherein the inserting includes:
       encoding the plurality of transitions across the plurality of levels such that different ones of the plurality of transitions are encoded in different ones of the plurality of levels, wherein a given transition is encoded by setting, in the character-addressable matrix that corresponds to the given transition, an indication at a matrix location addressed using the two successive characters of the given transition;
    maintaining lineage information in association with the indication, wherein the lineage information specifies a set of database key lineages, a given one of which specifies one or more characters of a particular inserted database key that precede the two successive characters that are also in that particular inserted database key; and
    sending, to another computer system, the data structure to enable the other computer system to determine whether to request a database record from the particular location.

11. The non-transitory computer readable medium of claim 10, wherein the indication identifies the lineage information.

12. The non-transitory computer readable medium of claim 10, wherein the operations further comprise:
prior to inserting the database key into the data structure, allocating the data structure such that a particular character-addressable matrix in the plurality of levels has a particular memory size;
prior to sending the data structure to the other computer system, performing a compression operation on the data structure, wherein the compression operation includes:
determining that a memory size of data written to the particular character-addressable matrix does not consume a threshold amount of the particular memory size; and
replacing the particular character-addressable matrix with particular data in another format, wherein the particular data is indicative of the data written to the particular character-addressable matrix.

13. The non-transitory computer readable medium of claim 10, wherein the operations further comprise:
in response to inserting a threshold number of database keys into the data structure, creating a second data structure in which to insert subsequent database keys.

* * * * *